United States Patent
Le

(10) Patent No.: US 7,067,088 B2
(45) Date of Patent: *Jun. 27, 2006

(54) STRATIFIED FLOW CHEMICAL REACTOR

(75) Inventor: Vinh N. Le, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 707 days.

This patent is subject to a terminal disclaimer.

(21) Appl. No.: 10/044,713

(22) Filed: Jan. 12, 2002

(65) Prior Publication Data

US 2003/0133856 A1    Jul. 17, 2003

(51) Int. Cl.
F28D 15/02    (2006.01)
F28D 15/00    (2006.01)

(52) U.S. Cl. ............. 422/206; 422/198; 422/200; 422/203; 165/104.21; 165/104.22; 165/104.26

(58) Field of Classification Search ......... 422/198, 422/200, 201, 206; 165/104.26, 104.22, 165/104.21
See application file for complete search history.

(56) References Cited

U.S. PATENT DOCUMENTS

| | | | |
|---|---|---|---|
| 1,873,876 A | 8/1932 | Downs | 422/188 |
| 2,217,469 A | 10/1940 | Clarke | 165/181 |
| 2,585,462 A | 2/1952 | Hirsch | 422/111 |
| 2,596,299 A | 5/1952 | Simpson | 422/200 |
| 3,930,800 A | 1/1976 | Schoener | 422/145 |
| 4,393,663 A * | 7/1983 | Grunes et al. | 62/119 |
| 4,474,230 A | 10/1984 | McCallister | 165/104.21 |
| 4,538,423 A | 9/1985 | Le Diouron | 62/222 |
| 5,009,263 A * | 4/1991 | Seshimo et al. | 165/151 |
| 5,056,586 A | 10/1991 | Bemisderfer | 165/109.1 |
| 5,253,702 A | 10/1993 | Davidson et al. | 165/80.4 |
| 6,196,296 B1 * | 3/2001 | Wisniewski et al. | 165/47 |

FOREIGN PATENT DOCUMENTS

| | | |
|---|---|---|
| DE | 19740658 | 3/1999 |
| EP | 0715886 | 6/1996 |
| FR | 1021255 | 2/1953 |
| JP | 60153936 | 8/1985 |

OTHER PUBLICATIONS

Database WPI, Derwent Publications Ltd., DE19740658, Mar. 18, 1999, IRT-Innovative Recycling Technologie GmbH.
Patent Abstracts of Japan, vol. 009, No. 317 (C-319), Dec. 12, 1985, for JP 60153936, Babcock Hitachi KK.

* cited by examiner

Primary Examiner—Alexa D. Neckel
(74) Attorney, Agent, or Firm—Kramer Levin Naftalis & Frankel LLP

(57) ABSTRACT

A polymerization reactor for exothermic liquid phase reactions comprises a reaction zone which is divided into a plurality of channels by thermally conductive heat transfer fins which are conductively mounted on one or more heat pipes for the removal of heat of reaction from reactants and reaction products flowing between the heat transfer fins. The reactor of the invention is capable of maintaining essentially isothermal conditions without the use of complicated and maintenance intensive agitators. The reactor is particularly useful when viscosity of the reactants and/or reaction products is high, when the reaction conducted has a fast reaction rate and when consistent polymer properties are desired.

9 Claims, 3 Drawing Sheets

STRATIFIED FLOW CHEMICAL REACTOR

BACKGROUND OF THE INVENTION

1. Field of the Invention

The present invention relates to an improved chemical reaction apparatus which is capable of removing large heat fluxes from a viscous reaction mixture while maintaining the reaction mixture at essentially isothermal conditions. The invention also relates to a method of conducting chemical reactions, and in particular, polymerization reactions, at essentially isothermal conditions using the novel reactor of the invention.

2. Description of Related Art

A variety of commercially important chemical reactions, and in particular polymerization reactions, require that reactants be maintained within a narrow temperature range to achieve desired product properties.

In the case of certain polymerization reactions, due to the low conductivity and high viscosity of the reaction mixture, heat transfer is a limiting factor in reactor design. Further, it is frequently not possible to compensate for the low conductivity of a polymer reaction mixture by using lower coolant temperatures because low coolant temperatures cause polymer solidification in the reactor. In many polymer reactors, the poor heat transfer characteristics of polymer reaction mixture results in poor reaction temperature control resulting in the formation of undesirable products in the reactor. For example, temperature variations in polymer reactors can lead to the formation of polymer products having lower molecular weight than desired. This negatively affects the flow and mechanical properties of the desired polymer end product. Since it is frequently the case that undesirable polymer reaction products are not easily separated from desired polymer products, many attempts have been made to produce polymer reactors which are capable of controlling, within a narrow temperature range, the reaction temperature of highly viscous reactants with poor thermal conductivity.

A wide variety of designs have been developed for continuous flow polymerization reactors which can handle viscous process liquids with poor thermal conductivity.

U.S. Pat. No. 2,727,884 to McDonald describes a polymer reactor which uses forced convection heat transfer. In this reactor, banks of cooling tubes in which a heat transfer fluid is circulated are gently agitated in the polymer reaction mixture. The agitation improves heat transfer, and at the same time preventing channeling of less viscous material in the reactor. Examples of another type of mechanically agitated, convection-type reactor, known as a wiped-film reactor, are disclosed in U.S. Pat. No. 3,513,145 to Crawford, U.S. Pat. No. 3,679,651 to Kii and U.S. Pat. No. 4,011,284 to Gawne. The construction of the internal coils required by such reactors is extremely labor intensive and therefore very costly. Further, the internal heat transfer coils employed in such reactors have a history of failure causing polymer to be contaminated with heat transfer oil. Despite the agitation in these reactors, the heat transfer characteristic of wiped-film reactors is nevertheless poor and hot spots frequently develop in such reactors.

Another example of a polymer reactor designed to provide high heat removal capability is disclosed in U.S. Pat. No. 3,838,139 to Latinen. This patent describes a horizontal cylindrical reactor vessel equipped with an agitator consisting of a plurality of discs with small clearance with respect to the cylindrical vessel. The discs divide the reactor vessel into compartments. The heat of reaction is removed from the reactor by the direct evaporation of a volatile monomer from the reaction mixture. Although this form of heat transfer is generally accepted as more efficient than convection, hot spots with temperature difference as high as 5–10° C. are still experienced. Further, the temperature in the various compartments of the reactor are not necessarily the same due to different polymer concentrations and reaction rates in the compartments.

Using the vaporization of volatile monomer reactants to remove the heat reaction from a polymer reaction mixture is generally not workable when the polymer reaction involves the co-polymerization of more than one monomer. In such cases, the vaporization of the different monomers is generally not equal causing uncontrolled concentration of the different co-monomers. Consequentially, the use of direct evaporation is to be avoided in such cases.

U.S. Pat. No. 4,419,488 to Fukumoto discloses another direct evaporation-type polymerization reactor. The inclusion of a mechanical agitator in a polymer reactor is often an unwanted necessity to improve heat transfer and homogeneity. These devices are costly, require much maintenance and can cause quality problems because the agitator shaft seal is often a source of air ingress to a reactor, which can generate undesirable oxidation by-products such as aldehydes and ketones. These compounds can retard a polymerization reaction and can cause product discoloration.

Several designs have eliminated the use of mechanical agitators in polymer reactors. U.S. Pat. No. 4,421,162 to Tollar and European Patent No. 0150225 A1 describe the use of flat annular plates disposed coaxially within a reactor shell. This concept can be applied to a polymerization reactor with a viscous reaction mixture by causing the heat of reaction to first be absorbed by conduction through the flat annular plates and then by conductive tubes which are in contact with the annular plates and then by convection into an appropriate heat transfer liquid flowing through the conductive tubes. The temperature in such reactor is usually well controlled, however, the volume occupied by the annular plates and tubes in the reactor reduce available reactor volume significantly. Variations of this heat transfer mechanism has been proposed by other inventors such as Oldershaw in U.S. Pat. No. 3,014,702, Brassie in U.S. Pat. No. 3,280,899, Aneja in U.S. Pat. No. 4,808,262 and Mattiussi in U.S. Pat. No. 5,084,134.

Anionic polymerization reactions have also been conducted in continuous stirred tank reactors. However, such reactions must generally proceed at low temperature due to the extreme reactivity of the reactants. Because it is desirable to operate continuous flow reactors hydraulically full to enable simple process control, heat removal in these reactors cannot depend on evaporation. Consequently, such reactors most often rely upon cooling jackets for heat transfer. However, the effectiveness of cooling jackets on anionic polymerization reactors is constrained by the low heat transfer coefficients applying of the convection mechanism and by the limited range of coolant temperature imposed by polymer solidification temperatures.

It would be desirable if there were available a continuous reactor for viscous polymer reaction mixtures with improved heat removal capability and with the capability of maintaining an essentially isothermal temperature profile throughout the reactor regardless of any varying heat loads associated with different reaction rates or reaction products. It would also be desirable if such a reactor were to be easy to construct, operate and maintain. It would further be desirable if the reactor were to have a relatively large void fraction for the conduct of polymerization reactions in as small a vessel as possible.

These benefits and other advantages are achieved with the present invention.

SUMMARY OF THE INVENTION

A stratified flow reactor of the invention consists of a shell, a heat transfer fluid channel, at least one heat pipe and a plurality of fins. The reaction zone is the shell side of the reactor and the heat pipe or heat pipes with fins mounted thereon extend through the reaction zone. The heat pipe or pipes are in fluid communication with the heat transfer fluid channel. The reactor vessel is closed at one end with at the other end being a cooling chamber through which the heat pipe or multiple heat pipes protrude. The heat pipe or pipes act as super heat conductors from the fins to the heat transfer fluid channel. In a preferred embodiment, the stratified flow react if the invention is a continuous flow polymerization reactor.

As described in U.S. Pat. No. 2,350,348 to Gaugler, heat pipes utilize evaporation of a heat transfer fluid from a porous medium affixed to a heat transfer surface to absorb heat. In the present invention, the heat pipe removes the heat of reaction from the reaction mixture by evaporative cooling from the heat transfer surface of the heat pipe system. The porous medium on the heat transfer surface is commonly referred to as a "wick". The evaporation of the heat transfer fluid from the porous medium or wick enjoys extremely good heat transfer coefficients and enables extremely high heat flux at essentially isothermal conditions. If desired, the evaporated heat transfer fluid is condensed and returned to the heat transfer zone of the reactor. Since heat transfer coefficients associated with condensation are also high, both the heat absorption and heat release segments of the heat pipe equipped reactor of the invention enjoy very high heat flux rates.

The benefits of utilizing a heat pipe heat transfer device in the reactor of the invention as described are derived from its converting what would otherwise be convection heat transfer or submerged heat transfer surface evaporative cooling to evaporative cooling of a thin film from a porous surface from which the evaporated heat transfer fluid can quickly and easily escape. Convection heat transfer is limited by many factors, including the velocity of the heat transfer fluid, the temperature differential between the reaction mixture and the cooling fluid, the viscosity of the heat transfer fluids, the surface area available for heat transfer, the materials of construction of the heat transfer device and the condition of the heat transfer surfaces, i.e., whether they are fouled. Conventional evaporative cooling from a submerged heat transfer surface enjoys higher heat transfer coefficients than convection cooling, but is limited by the liquid phase surrounding the submerged tubes. The heat pipe substitutes thin film evaporation for submerged heat transfer surface boiling with a corresponding improvement of the tube side heat transfer coefficient of up to 10 times. Further, the heat release segment of the reactor of the invention relies upon the condensation of a heat transfer fluid which can take place in a condenser which is remote from the reactor, so that the surface area available for cooling need not be limited to the area of the heat pipe. Accordingly, condenser(s) with sufficient surface area to handle the required heat flux can be located away from the reactor of the invention while still being in close proximity to it.

Because the evaporation of a pure heat transfer fluid occurs at a single temperature and the heat transfer coefficients for the heat pipe heat transfer system of the present invention are very good, a stratified flow reactor equipped with a heat pipe heat exchange device according to the present invention can be operated at essentially isothermal conditions.

As described by Faghri ("Heat Pipe Science and Technology", Taylor and Francis, 1995) and by Peterson ("An Introduction to Heat Pipes", John Wesley & Sons, 1994), the choice of the material of construction, the choice of the heat transfer fluid and the design of the wick structure for the heat pipe apparatus of the invention are within the capability of those skilled in the art. The materials of construction in contact with the heat transfer fluid are commonly selected from copper and copper alloys, aluminum and its alloys and stainless steels.

Although the term heat "pipe" is used in the description of this invention, innumerable configurations are possible, some of which are far from the cylindrical shape of a conventional pipe. For example, possible shapes could be, but are not limited to, flat, rectangular, annular, polygonal or tubular. When tubular heat pipe design is used, tube size can vary from less than 1 mm to several cm in diameter.

The heat pipe heat transfer system of the present invention is comprised of two or three sections: (1) an evaporator section where heat is absorbed by vaporizing a liquid heat transfer fluid, (2) an adiabatic section where the vaporized heat transfer fluid flows without changing state, and optionally, (3) a condenser section where the vaporized heat transfer fluid is condensed using an external source of cooling. The heat transfer fluid condensate can be returned to the evaporator section of the reactor by gravity or by pumping. The evaporator section of the heat pipe heat transfer system of the invention is comprised of a heat transfer tube having a porous surface or wicked internal surface. The heat transfer fluid is supplied to the porous or wicked heat pipe surface where the wicking action of the porous surface or wick wets the heat pipe with a thin film of heat transfer fluid. Because wicking is a surface tension phenomenon which can be limited in long heat pipes by liquid head, it is sometimes preferred for a reactor according to the invention to be comprised of multi-reactor sections, each having heat pipe transfer zones.

The heat pipe of the invention may be 1) sealed or 2) of the thermosyphon type.

When a reaction mixture is viscous such as a polymer syrup, heat transfer through the reactor of the invention is superior to convection, direct evaporation or conduction. The invention utilizes all three of these methods of heat transfer with maximum effectiveness without causing detrimental side effects. Heat of reaction is evenly extracted from the reacting viscous polymer syrup as it flows, in a laminar fashion, past the plurality of fins in the reactor shell. The fins can be made of a multitude of geometric shapes and materials of construction. Using conductive metals such as copper and aluminum alloys enhances thermal performance when these the materials are compatible with the process fluid. Conductance is further increased by constructing flat heat pipes as fins or embedding mini heat pipes within conventional fins. Conductance over long distance is avoided by locating the fins a short distance from the heat pipe or heat pipes. The heat pipe or pipes of the reactor act as collecting header(s) where the heat of reaction is transferred very quickly through indirect evaporation. No evaporation of monomers is involved. The use of a suitable internal fluid with a high latent heat of evaporation, such as water, can even improve heat transfer over the direct evaporation of the monomers themselves.

The design of a heat pipe for use a reactor according the invention depends on such factors as chemical resistance and compatibility, temperature range, operating pressure and desired heat flux.

In the sealed heat pipe embodiment of the invention, at the condenser end of the reactor, the heat of reaction is transferred to a condenser heat transfer fluid using forced convection turbulent flow heat transfer. Preferably, the condenser heat transfer fluid has relatively low viscosity and enables high heat transfer coefficients. The reactor of the invention does not require the use of any rotating equipment.

If a heat pipe in the reactor fails, the reactor is minimally affected as small and temporary contamination with the heat transfer fluid does not require a plant outage and heat load is taken over by other heat pipes in the vicinity of the failed heat pipe. The improved reliability means extended service life and low maintenance cost.

In the thermosyphon heat pipe embodiment of the invention, gravity or a pump is used to return reactor heat transfer fluid condensate to the reactor heat pipe(s) through separate piping. In a variant of this embodiment, the heat pipe(s) can communicate with a low-pressure vapor (steam) header serving a network of vapor (steam) users. In such case, a source of clean heat transfer fluid, such as boiler feed water, is required. The advantages of using thermosyphon heat pipe(s) in the reactor of the invention over sealed heat pipes include: 1) the cogeneration of low-pressure steam from reactor waste heat and elimination of reactor coolers, and 2) enabling the remote location of condensers with more surface area and multiple forms of cooling.

In the reactor of the invention, the heat transfer fluid is chosen to assure trouble free heat pipe operation depending on the temperature of operation. It can be selected from liquids having the desired boiling point at a selected operating pressure. Common heat transfer fluids are water, acetone, alkanes, ammonia, fluorocarbons, aromatic solvents and even pure liquid metals.

The wick utilized in the invention can be comprised of fiber mats, sintered metal powders of spherical or non-spherical shape, of single size or multiple sizes, and metal screens in single or multiple layers, all with or without external surface enhancements, such as fins. In a preferred embodiment of the invention the porous surface or wick is applied to the interior surface of the heat pipe by preparing a paste of metal powder with a liquid binder, applying the paste to the inside surface of the heat pipe and then heating the heat pipe to evaporate the liquid binder and sinter the metal powder to the interior surface of the heat pipe. Alternatively, a dummy core is inserted into the heat pipe and metal powder is sifted into the space between the core and the interior of the heat pipe. The heat pipe is then heated to sinter the metal powder to the surface of the heat pipe and the core then removed. A metal powder which may be advantageously used in the invention is copper powder.

In a preferred practice, two or more reactors of the invention are operated in series so as to provide multiple temperature zones suitable for manufacturing polymers of the desired properties. Isothermal reactors are particularly required when the rate of reaction is high (such as in anionic polymerization) or when the rate of heat removal is low (due to high viscosity, poor heat conductivity or low velocity).

In the case of thermosyphons, heat pipe temperature is regulated by the pressure of the heat transfer fluid. In the case of sealed heat pipes, heat pipes operating temperature is regulated by the circulating condenser heat transfer medium temperature. Temperature over the entire reactor can be controlled well within 1 degree C.

The reactor of the invention can be operated hydraulically full, meaning without vapor space. In this way, for any given flow rate of reactants the residence time in the reactor is known. This flow scheme simplifies process control enormously. A pump is used to push the material through the reactor or a series of reactors. Flow measurement can be made simply and accurately at the beginning of the process when viscosity is low, and there is no need to control the level or net weight of the reaction vessel, as is required with partially full reactors. Simplified instrumentation and control translates into very predictable and consistent polymer properties and ease of operation.

Any polymerization reaction system in the liquid phase may be used in the reactor of the present invention. The polymer reaction mixtures or syrups can be solutions of polymer or co-polymers in their respective monomers (mass polymerization) and solutions of polymers in solvents and their monomers (solution polymerization) generally having viscosities ranging from 1,000 cp to 500,000 cp and preferably ranging from 10,000 cp to 200,000 cp. Examples of monomers or co-monomers usable with this invention are:

Ethylene (PE)
Propylene (PP)
Styrene (PS, ABS, SAN, SIBS)
Butadiene (PBR)
Acrylonitrile (PAN)
Acrylamide (Polyacrylamidej Dimethyl Terephtalate (PET)
Terephtalic acid (PET)
Methyl Methacrylate (PMMA)
Caprolactam (PA)
Naphtalene Dicarboxylate (PEN)
Maleic anhydride (SMA)

BRIEF DESCRIPTION OF THE DRAWINGS

Further features and advantages of the present invention will become apparent from the following description taken in connection with the annexed drawings, in which.

DETAILED DESCRIPTION OF THE INVENTION

Chemical reactors with heat pipe heat transfer devices and methods of using such devices to perform chemical reactions are disclosed. In the following detailed description of the invention, for purposes of explanation, specific features, materials, dimensions and the like may be set forth to provide a thorough understanding of the present invention. However, it will be apparent to those skilled in the art that the present invention may be practiced without these specific details. In some instances, well known devices are shown in simplified or block diagram form so as not to obscure the invention unnecessarily.

Figure 1:
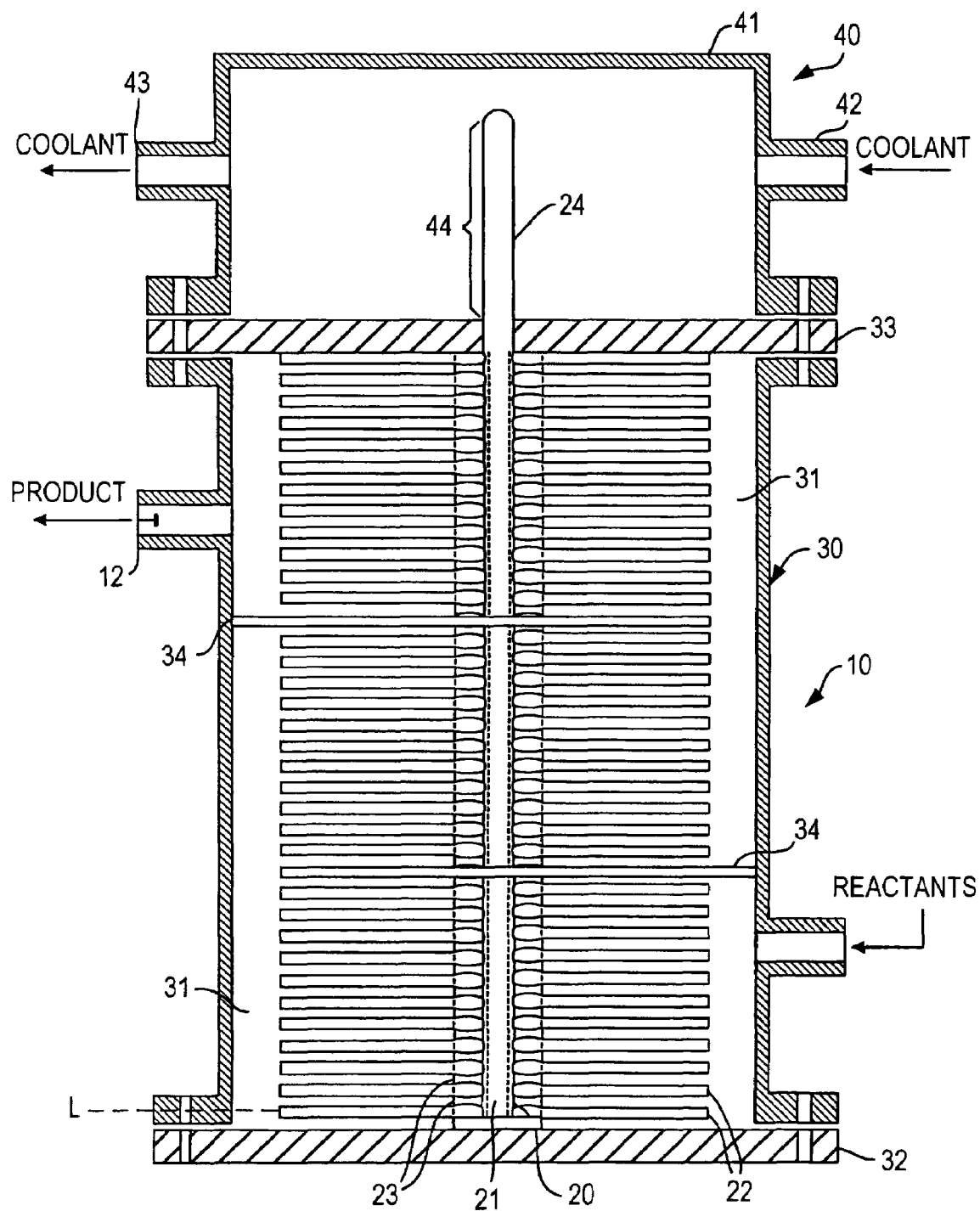
FIG. 1 is a longitudinal cross section of a reactor according with the present invention with a sealed heat pipe.

With reference to FIG. 1, a preferred embodiment of a chemical reactor 10 constructed according to the present invention is illustrated. For purposes of simplified illustration, reactor 10 is shown with a single heat pipe 20 in reactor shell 30. Reaction zone 31 is in the interior of reactor shell 30. A commercial reactor 10 could contain hundreds of heat pipes 20. Heat pipe 20 is equipped with wick surface 21 in the area of reaction zone 31. Reactants are fed into reactor 10 through input nozzle 11. Product from reactor 10 flows through output nozzle 12. Reactor shell 30 is sealed with inlet head 32 and outlet head 33.

Heat pipe 20 is equipped with fins 22 which are mounted on heat pipe 20 so as to enable good thermal conductivity between fins 22 and heat pipe 20. Fins 22 are spaced apart along the length of heat pipe 20 using spacers 23. Heat pipe 20 extends through outlet head 33 into condenser 40. Condenser section 44 of heat pipe 20 in condenser 40 can optionally be equipped with fins on its external surface. Heat pipe 20 is mounted on outlet head 33 in sealed fashion to prevent the flow of reactants from reaction zone 31 into condenser 40 or coolant from condenser 40 into reaction zone 31. Condenser 40 is comprised of closed shell 41. Condenser 40 is mounted on reactor 10 at outlet head 33.

Liquid coolant is fed into condenser 40 through coolant feed nozzle 42 and exits condenser 40 through coolant outlet nozzle 43. Heat pipe 20 contains a liquid heat transfer fluid ("HTF") having a boiling point which is the same as the design operating temperature of reactor 10. Heat pipe 20 contains an amount of HTF which is sufficient to fully wet wick surface 21 within heat pipe 20 and to fill the remaining space of heat pipe 20 with vaporized HTF. In a preferred embodiment of the invention, wick surface 21 extends into a pool liquid HTF below level L in heat pipe 20 so that capillary action can draw liquid HTF into wick surface 21. The heat of reaction released by the reactants in reaction zone 31 is conducted through fin 22 and heat pipe 20 and causes the evaporation of the HTF on wick surface 21, which draws more wetting of wick surface 21 by capillary pumping. The HTF evaporated from wick surface 21 flows through the center of heat pipe 20 into condenser section 44 of heat pipe 20. The vaporized HTF transfers its heat of vaporization to the coolant in condenser 40 by conduction through the wall of heat pipe 20. This causes the evaporated HTF in heat pipe section 24 to condense and then flow down heat pipe 20, so that it is available for the rewetting of wick surface 21.

In the vertical reactor orientation of the invention depicted in FIG. 1, the length of heat pipe 20 is limited by the maximum capillary height. If necessary, several heat pipe zones may be present to cover a long section of a vertical reactor 10. Alternatively, reactor 10 can be arranged in a horizontal orientation so that the length of heat pipe 20 is not limited by the capillary height.

Reactor 10 is equipped with baffles 34 to cause the reaction mixture to flow between fins 22.

In operation, upon entry of a reaction mixture into reaction zone 31 an exothermic chemical reaction commences or continues and releases its heat of reaction to fins 22. The heat of reaction is conducted through fins 22 to heat pipe 20, and then by conduction through heat pipe 20 to the HTF on wick surface 21 on the interior surface of heat pipe 20. The heat of reaction causes the liquid HTF to vaporize and flow through the center of heat pipe 20 to condenser 40 where the vaporized HTF gives up its heat of vaporization to the condenser coolant and condenses to form liquid HTF. The liquid HTF flows down wick surface 21 from condenser 40 rewetting wick surface 21 from the top and also flows down the center of heat pipe 20 to form a liquid pool extending to elevation L at the bottom of heat pipe 20. The liquid pool at the bottom of heat pipe 20 provides HTF to rewet wick surface 21 by capillary pumping.

In reaction zone 31, as the reaction mixture flows between fins 22 following the path defined by baffles 34, it continues to react to form the desire product at essentially isothermal conditions because of the intimate contact of the reaction mixture with fins 32 and the excellent isothermal heat transfer enabled by heat pipe 20.

Figure 2:
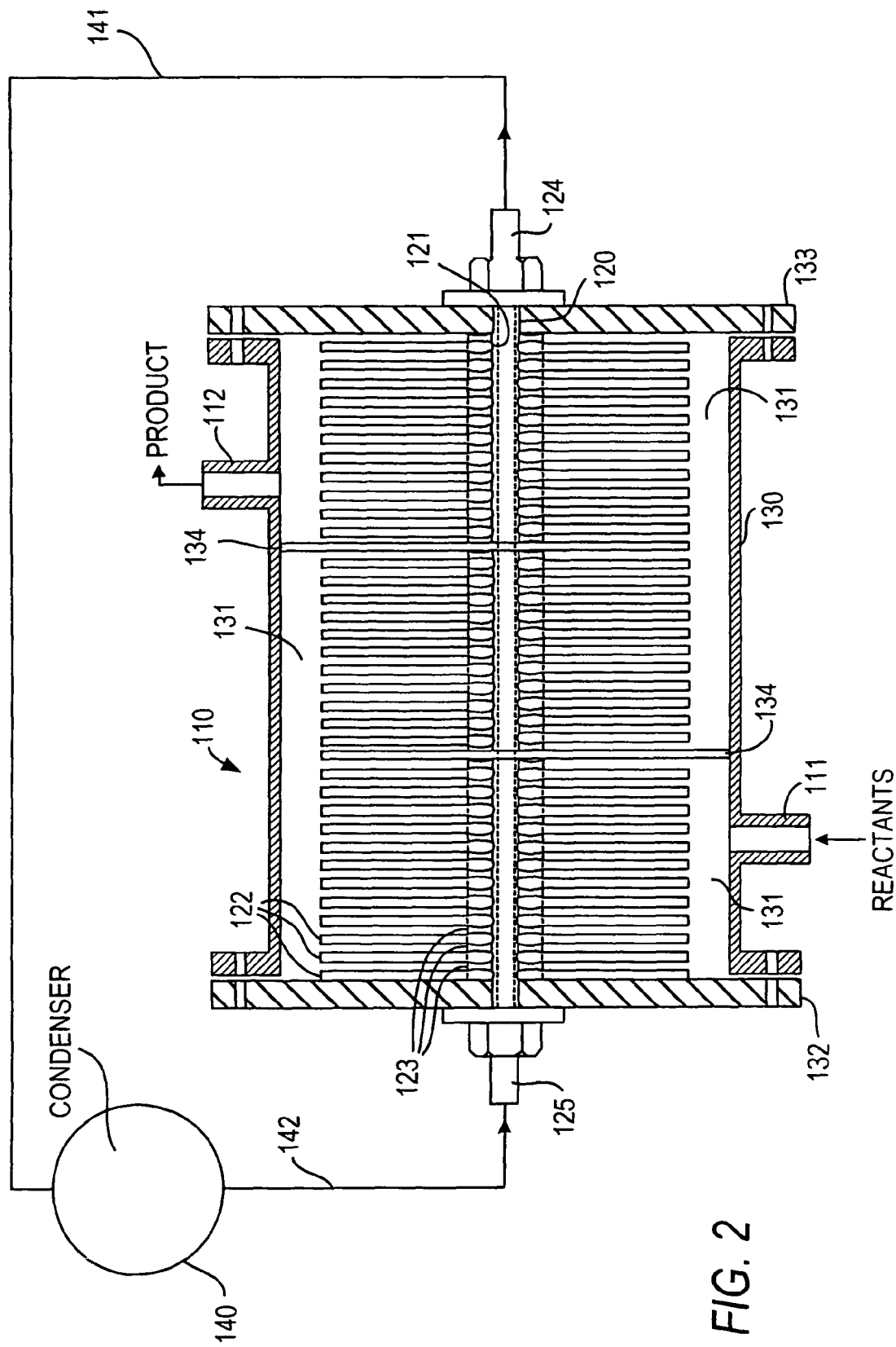
FIG. 2 is a longitudinal cross section of a reactor according to the invention with a thermosyphon heat pipe.

With reference to FIG. 2, a preferred embodiment of a chemical reactor 110 with a thermosyphon type heat pipe 120 constructed according to the present invention is illustrated. For purposes of simplified illustration, reactor 110 is shown with a single heat pipe 120 in reactor shell 130. Reaction zone 131 is in the interior of reactor shell 130. A commercial reactor 110 could contain hundreds of heat pipes 120. Heat pipe 120 is equipped with wick surface 121 in the area of reaction zone 131. Reactants are fed into reactor 110 through input nozzle 111. Product from reactor 110 flows through output nozzle 112. Reactor shell 130 is sealed with inlet head 132 and outlet head 133.

Heat pipe 120 is equipped with fins 122 which are mounted on heat pipe 120 so as to enable good thermal conductivity between fins 122 and heat pipe 120. Fins 122 are spaced apart along the length of heat pipe 120 using spacers 123. Heat pipe 120 extends through inlet head 132 and outlet head 133 in sealed fashion to prevent the leaking of reactants from reaction zone 131. Heat pipe outlet 124 communicates with condenser feed line 141. Heat pipe inlet 125 communicates with condenser outlet line 142. Condenser feed line 141 carries vaporized HTF to condenser 140 and condenser outlet line 142 carries condensed liquid HTF from condenser 140 to heat pipe inlet 125.

Heat pipe 120 contains, but is not filled with liquid heat transfer fluid ("HTF") having a boiling point which is the same as the design operating temperature of reactor 110. The HTF wets wick surface 121. The heat of reaction causes the evaporation of the HTF on wick surface 121. The HTF evaporated from wick surface 121 flows through the center of heat pipe 120 to heat pipe outlet 124 and then to condenser feed line 141 and condenser 140. The vaporized HTF transfers its heat of vaporization to a coolant in condenser 140 by conduction. This causes the evaporated HTF to condense and then to flow through condenser outlet line 142 from which position the liquid HTF wets wick surface 121.

Reactor 10 is equipped with baffles 134 to cause the reaction mixture to flow between fins 122.

In operation, upon entry of a reaction mixture into reaction zone 131 an exothermic chemical reaction commences or continues and releases its heat of reaction to fins 122, the heat of reaction is conducted through fins 122 to heat pipe 120, and then by conduction through heat pipe 120 to the HTF wetting wick surface 121 on the interior surface of heat pipe 120. The heat of reaction causes the liquid HTF to vaporize and flow through the center of heat pipe 120 to condenser 140 where the vaporized HTF gives up its heat of vaporization to the condenser coolant and condenses to form liquid HTF. The liquid HTF flows by gravity or pumping to heat pipe inlet 125 and wets wick surface 121 by capillary pumping.

In reaction zone 131, as the reaction mixture flows between fins 122 following the path defined by baffles 134, it continues to react to form the desire product at essentially isothermal conditions because of the intimate contact of the reaction mixture with fins 132 and the excellent isothermal heat transfer enabled by heat pipe 120. Product exits reactor 110 at outlet 112.

Because reactor 110 is positioned with heat pipe 120 in a horizontal orientation, the wicked length of heat pipe 120 can be longer than the maximum vertical capillarity height of wick surface 122.

Reactors 10 and 110 can be equipped with fins 22 or 122 having mini sealed heat pipe embedded therein or soldered to the surface of fins 22 or 122. Mini heat pipes in or on fins 22 or 122 act as enhanced heat transfer devices within fins 22 or 122 conveying heat from sections of fins 22 or 122 which are remote from heat pipe 20 or 120 to the heat pipe. The length of the mini sealed heat pipe is controlled by the distance from heat pipe 20 or 120 to the outer most extent of fins 22 or 122. The mini heat pipe preferably has an interior diameter in the range of 2 mm to 5 mm. The wick is applied to the interior surface of the mini heat pipes in the same fashion as aforedescribed for principal heat pipes 20 or 120. Heat is absorbed at the evaporator end of the mini sealed heat pipes in sections of the fins which a remote from a heat pipe and is conveyed to condenser section of the mini sealed heat pipe proximate to the major heat pipe 20 or 120.

Figure 3:
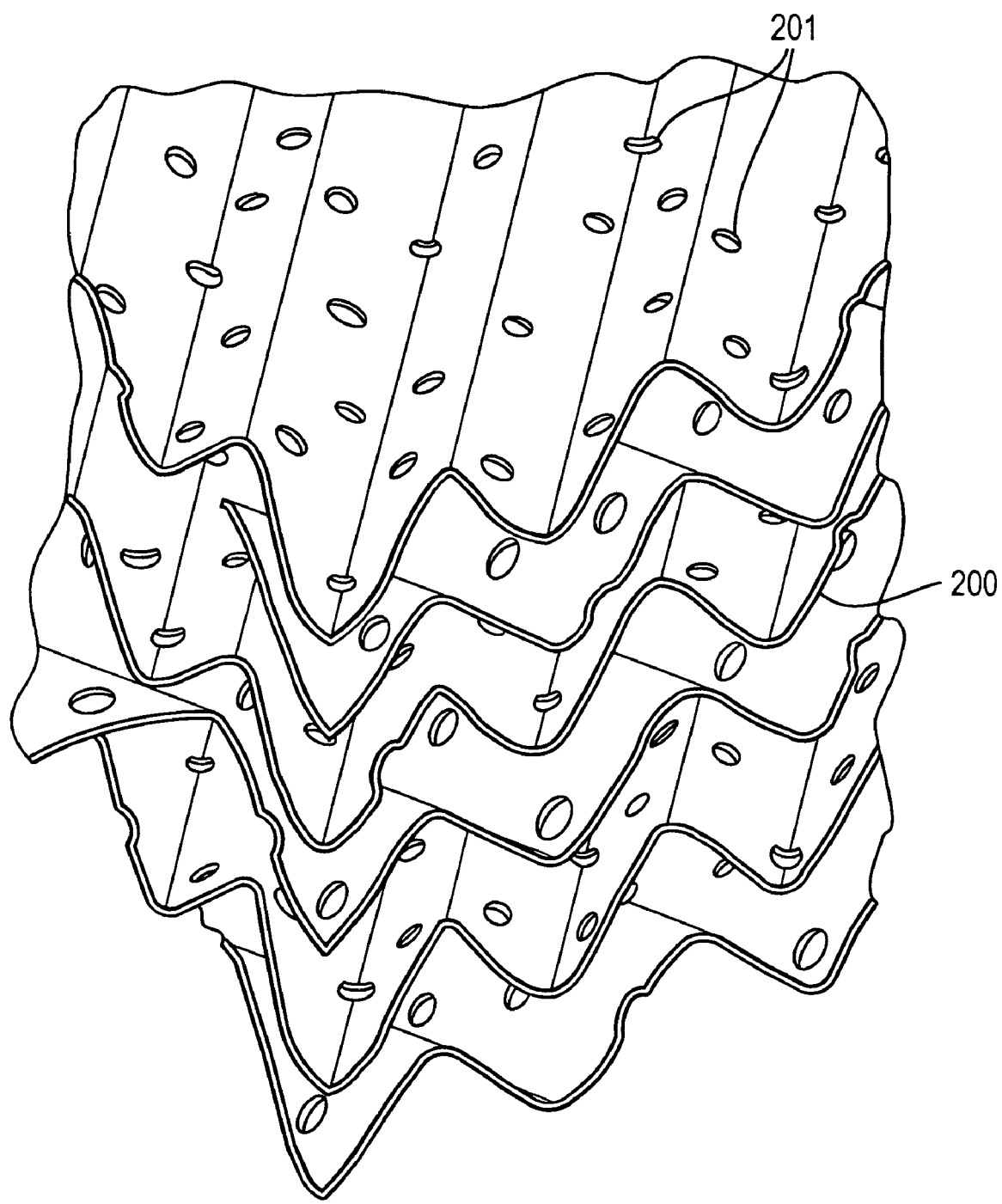
FIG. 3 is a sectional view a corrugated fin arrangement which can be used in reactors according to the invention.

In an alternate embodiment of the invention, fins 22 or 122 can be flat heat pipes comprised of two flat conductive sheets having a porous layer applied to one side. The conductive sheets are bonded together with the porous layer and a liquid heat transfer fluid inside. The heat transfer fluid should have a boiling point which is the design operating temperature of the reactor and should not completely fill the void space between the conductive sheets. The flat heat pipe can be made by applying a porous surface to a flat sheet and folding it so that the porous surface is inside. The periphery of the sheet is sealed by stamping or welding. Where necessary to prevent bulging caused by the pressure of the vaporized heat transfer fluid in the flat heat pipe, the fold sheet can be secured with welds or by stamping at one or more interior positions. The flat heat pipe can be folded into corrugated fins 200, as shown in FIG. 3. Corrugated fins 200 can be equipped with perforation 201 through which process fluid may pass to promote mixing and to avoid channeling. Perforations 201 are preferably sealed by stamping or welding.

EXAMPLE

The following example illustrates the efficacy of the reactors of the invention to maintain essentially isothermal conditions in chemicals and especially polymerization reactions.

Polystyrene mass polymerization technologies are differentiated by the configuration of the main polymerization reactors used to bring conversion from 30% to 45% solids to 65% to 85% solids. During the course of the polymerization reaction large amounts of heat is evolved. If this heat of reaction is not removed, the reactor temperature will increase causing an unwanted and uncontrolled spread of the polymer molecular weight which adversely affects polymer properties.

A polystyrene mass polymerization is conducted in a reactor according to the invention consisting of a jacketed vertical pipe containing several straight heat pipes onto which are fitted a number of fins. The inside of the heat pipes is covered with a porous medium from which a heat transfer fluid is vaporized to provide cooling. This vaporized heat transfer fluid is continually replaced by the capillary action of the porous medium on a pool of heat transfer fluid below. The heat transfer fluid is chosen to provide low surface tension, high heat of evaporation and stability over the operating temperature range. The vaporized heat transfer fluid is condensed in an external heat exchanger. The condensate is returned to the bottom of the heat pipes by gravity. For startup the jacket is heated with hot oil. The tubes are drained and vented to atmosphere to prevent over pressurization.

The anionic polymerization of styrene using the organo-lithium catalyst, normal butyl lithium, is considered. The polymerization rate is very fast and the reaction goes to completion in approximately 2 hours of residence time. Toluene, or alternatively ethylbenzene, is used to keep the reaction mixture in a liquid state at low temperature.

In the example, a stream of 70% styrene in toluene flowing at 10,000 kg/hr is reacted. It is desired to maintain a temperature of 100° C. throughout the reactor, which consists of a shell 8 ft diameter by 16 ft long, giving a residence time of 2 hours. The fins are made of flat aluminum heat pipes corrugated in a triangular pattern. The fins are made from sheets of aluminum with a layer of very fine copper powder sintered on one side. The sheets are bonded together with the porous layer and liquid water on the inside. The double sheets are perforated with 1" diameter and ⅜" diameter holes with a fluid tight seal being maintained all around the double sheets and in the positions of the perforations. The 1" holes are aligned and one hundred 1" heat pipes are inserted and pressure expanded to provide intimate bonding with the fins and mechanical strength. The 1" heat pipes are made of copper tubing in which a layer of fine copper powder has been sintered. The outside is clad with aluminum to make the pipes corrosion-compatible with styrene. The corrugated fins are stacked together in layers after being rotated by 90° with respect to each other as illustrated in FIG. 3. The process fluid flows within the triangular channels and through the ⅜" holes to communicate with neighboring channels and thus are in intimate contact with the fins. This flow pattern creates a status mixing effect, which prevents channels from plugging.

The heat pipes are mounted between tube sheets so that the outlet end of the heat pipe communicates with the condenser inlet and the condenser outlet communicates with the inlet end of the heat pipes. The heat pipes and fins form a bundle that is inserted in the tubular reactor shell, such as that depicted in FIG. 2. Reactants flow through the reactor shell as depicted in FIG. 2.

Polymer is recovered by subjecting the reactor effluent to 240° C. and devolatilization of the solvent under vacuum. The solvent is recycled. The remaining viscous melt is then pelletized by strand bath or underwater technique as commonly practiced.

The above description of the invention is intended to be illustrative and not limiting. Various changes or modifications in the embodiments described may occur to those skilled in the art. These can be made without department from the spirit or scope of the invention.

I claim:

1. A continuous flow reactor for conducting chemical reactions of one or more chemical reactants having an exothermic heat of reaction comprising:
    a reactor shell having an inlet end tube sheet and an outlet end tube sheet;
    the reactor shell having an internal reaction zone between said inlet and outlet end tube sheets;
    at least one thermally conductive principal heat pipe extending between said inlet end and outlet end tube sheets and at least one end of said principal heat pipe extending through one of said tube sheets in fluid sealed manner to a position outside the reaction zone;

said reactor having a reactant inlet for introducing reactants to said reaction zone and a product outlet for conducting reaction products from said reaction zone;

a plurality of thermally conductive extended heat transfer surfaces comprising a plurality of sealed secondary heat pipes mounted in conducting manner on the exterior surface of said principal heat pipe and extending into said reaction zone for receiving the heat of reaction from said reactants and conveying it to said at least one principal heat pipe;

said extended heat transfer surfaces defining there between channels for the flow said chemical reactants through said reaction zone; and said at least one principal heat pipe having an evaporation section within the reaction zone and containing a liquid heat transfer fluid for absorbing the heat of reaction from said reactants by evaporating at substantially isothermal conditions to form a vaporized heat transfer fluid which is conveyed from said reaction zone.

2. The continuous flow reactor of claim 1, wherein the principal heat pipe is a sealed heat pipe and the end of said principal heat pipe which extends through the tube sheet is a condenser adapted to absorb the heat of reaction from said vaporized heat transfer fluid.

3. The continuous flow reactor of claim 1, wherein said at least one principal heat pipe is a thermosyphon heat pipe and said principal heat pipe has a first end which extends in fluid sealed manner through said outlet end tube sheet and said principal heat pipe has a second end which extends in fluid sealed manner through said inlet end tube sheet, said heat pipe having a first end in fluid communication with a heat exchanger for conveying said vaporized heat transfer fluid to said heat exchanger and said principal heat pipe having a second end in fluid communication with said heat exchanger for conveying condensed heat transfer fluid to said principal heat pipe.

4. The continuous flow reactor of claim 1, wherein said at least one principal heat pipe is in fluid communication with a heat transfer device which is external to said reaction zone for removal of the heat of reaction from said continuous flow reactor, said thermally conductive extended heat transfer surfaces are fins and said plurality of sealed secondary heat pipes are in thermally conductive contact therewith, said secondary heat pipes having a first closed end adjacent to said principal heat pipe and in thermal communication therewith and extending from said principal heat pipe to a second closed end which is remote from said principal heat pipe, and said secondary heat pipes containing a liquid heat transfer fluid for absorbing the heat of reaction from said reactants by evaporating at substantially isothermal conditions to form a vaporized heat transfer fluid which can convey the absorbed heat of reaction to said principal heat pipe.

5. The continuous flow reactor of claim 2, wherein said thermally conductive extended heat transfer surfaces are fins and said plurality of sealed secondary heat pipes are in thermally conductive contact therewith, said secondary heat pipes having a first closed end adjacent to said principal heat pipe and in thermal communication therewith and extending from said principal heat pipe to a second closed end which is remote from said principal heat pipe, and said secondary heat pipes containing a liquid heat transfer fluid for absorbing the heat of reaction from said reactants by evaporating at substantially isothermal conditions to form a vaporized heat transfer fluid which can convey the absorbed heat of reaction to said principal heat pipe.

6. The continuous flow reactor of claim 3, wherein said thermally conductive extended heat transfer surfaces are fins and said plurality of sealed secondary heat pipes are in thermally conductive contact therewith, said secondary heat pipes having a first closed end adjacent to said principal heat pipe and in thermal communication therewith and extending from said principal heat pipe to a second closed end which is remote from said principal heat pipe, and said secondary heat pipes containing a liquid heat transfer fluid for absorbing the heat of reaction from said reactants by evaporating at substantially isothermal conditions to form a vaporized heat transfer fluid which can convey the absorbed heat of reaction to said principal heat pipe.

7. The continuous flow reactor of claim 1, wherein said at least one principal heat pipe is in fluid communication with a heat transfer device which is external to said reaction zone for removal of the heat of reaction from said continuous flow reactor, at least one of said plurality of sealed secondary heat pipes is a sealed flat heat pipe extending from said principal heat pipe into said reaction zone, said flat heat pipe contains a liquid heat transfer fluid for absorbing the heat of reaction from said reactants by evaporating at substantially isothermal conditions to form a vaporized heat transfer fluid which can convey the absorbed heat of reaction to said principal heat pipe.

8. The continuous flow reactor of claim 2, wherein at least one of said plurality of sealed secondary heat pipes is a sealed flat heat pipe extending from said principal heat pipe into said reaction zone, said flat heat pipe contains a liquid heat transfer fluid for absorbing the heat of reaction from said reactants by evaporating at substantially isothermal conditions to form a vaporized heat transfer fluid which can convey the absorbed heat of reaction to said principal heat pipe.

9. The continuous flow reactor of claim 3, wherein at least one of said plurality of sealed second heat pipes is a sealed flat heat pipe extending from said principal heat pipe into said reaction zone, said flat heat pipe contains a liquid heat transfer fluid for absorbing the heat of reaction from said reactants by evaporating at substantially isothermal conditions to form a vaporized heat transfer fluid which can convey the absorbed heat of reaction to said principal heat pipe.

* * * * *